(12) United States Patent
McKinney

(10) Patent No.: US 7,178,677 B1
(45) Date of Patent: Feb. 20, 2007

(54) AERATION VESSEL FOR USE IN AEROBIC WASTEWATER TREATMENT SYSTEM

(75) Inventor: Jerry L. McKinney, Silsbee, TX (US)

(73) Assignee: Jerry L. McKinney 2002 Trust, Silsbee, TX (US)

( * ) Notice: Subject to any disclaimer, the term of this patent is extended or adjusted under 35 U.S.C. 154(b) by 0 days.

(21) Appl. No.: 11/263,462

(22) Filed: Oct. 31, 2005

(51) Int. Cl.
*C02F 3/00* (2006.01)
(52) U.S. Cl. ............... 210/513; 210/532.1; 210/220
(58) Field of Classification Search ............ 210/513, 210/532.1–538, 220
See application file for complete search history.

(56) References Cited

U.S. PATENT DOCUMENTS 3,923,656 A * 12/1975 Krebs et al. ................ 210/86
6,328,890 B1 * 12/2001 Thibault ................ 210/532.2

OTHER PUBLICATIONS

Alpha General Services, Inc., www.alphageneral.com, Product Catalog, including picture of Alpha 750 Septic Tanks—3 pages.

* cited by examiner

*Primary Examiner*—Chester T. Barry
(74) *Attorney, Agent, or Firm*—C. James Bushman; Browning Bushman P.C.

(57) ABSTRACT

An aeration vessel for use in a aerobic wastewater treatment system, the aeration vessel comprised of a bottom section having a bottom wall and an inverted frustoconical side wall, a top section having a frustoconical side wall and a partition having an inverted frustoconical side wall, the top and bottom sections being provided with mating flanges which can be sealingly engaged, the partition being disposed in the aeration vessel formed by the first and second section.

17 Claims, 3 Drawing Sheets

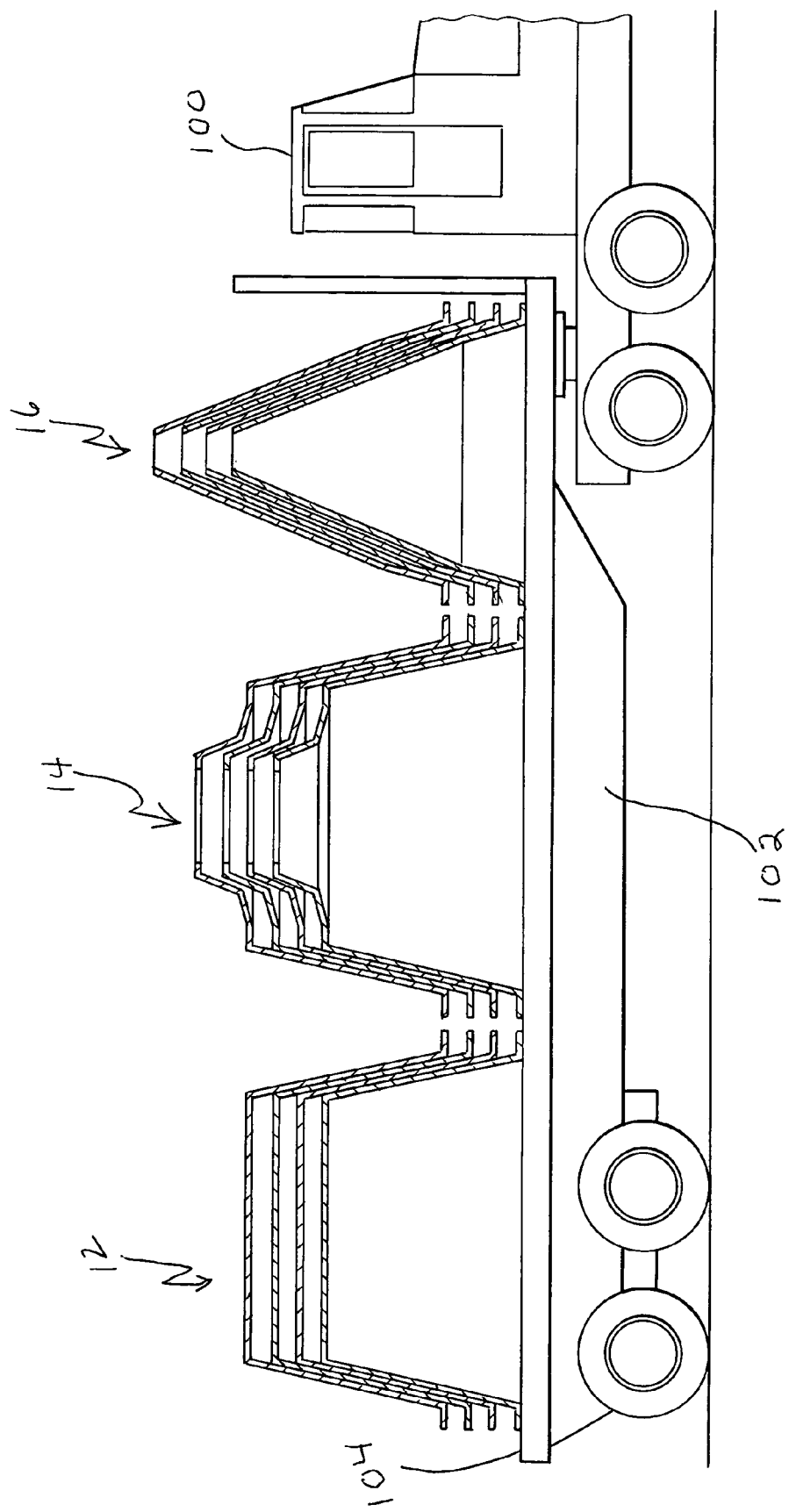

AERATION VESSEL FOR USE IN AEROBIC WASTEWATER TREATMENT SYSTEM

BACKGROUND OF THE INVENTION

1. Field of the Invention

The present invention relates to aerobic wastewater treatment systems and, more particularly, to an aeration vessel for use in such systems.

2. Description of Prior Art

Aerobic wastewater treatment systems are generally comprised of three main vessels, a trash or pretreatment vessel, an aeration vessel, and a pump tank. In a typical system, wastewater from a residence, industrial facility, or the like, passes into the pretreatment tank where most of the solids settle out. The effluent from the pretreatment tank then flows into the aeration vessel wherein remaining solids are subjected to aerobic digestion to provide a substantially solids free effluent which then passes into the pump tank for discharge. It is common for the aeration vessel to include an inverted frustoconical partition disposed in the aeration vessel which effectively divides the aeration vessel into an aeration chamber and a clarifier chamber, an oxygen-containing gas being introduced into the aeration chamber, substantially clarified water passing from the clarifier chamber into the pump tank.

Typical aeration vessels can be made of concrete, fiberglass, steel, etc., and can be rectangular, cylindrical, etc. Many aeration vessels are made of compositors comprised of fiberglass or similar reinforcing material(s) and a resin, e.g., epoxy, phenolic, etc., and are generally cylindrical in nature.

Because of the volume of the tanks, e.g., typically 400 to 1000 gallons, the vessels are quite large and bulky to ship.

Aside from being bulky in terms of shipping or transporting the aeration vessels to the desired location, aeration vessels made of composites, have a tendency to be somewhat buoyant with the result that in areas with high water tables or in ground which is highly saturated, they become buoyant enough to have a tendency to at least partially float.

Another problem with aeration vessels, particularly cylindrical type, made of composites is that, once in place in the ground, forces acting externally of the vessel by the surrounding earth, can cause the vessels to form cracks at approximately the middle region where the vessel is weakest in terms of having any supporting members to counteract the forces acting on the vessel in that region. In this regard, the bottom and top of the vessel are adequately supported against external, generally radially acting pressure, since the bottom wall and the top wall effectively act as reinforcing ribs.

SUMMARY OF THE INVENTION

In one embodiment of the present invention, there is provided an aeration vessel comprised of three main components—a first or bottom section having a bottom wall and an inverted frustoconical side wall, a second or top section having a frustoconical side wall, and a partition having an inverted frustoconical side wall. The first and second sections are provided with mating flanges, which can be sealingly engaged, the partition being disposed in the aeration vessel formed by the first and second sections. One preferred feature of the aeration vessel of the present invention is that respective ones of each of the three components are nestable in one another prior to being assembled to form the aeration vessel. Accordingly, multiple aeration vessels, albeit unassembled, can be shipped from a manufacturing location to a distribution location or installation site, the required shipping space being only a fraction of what would be necessary for an equal number of individual fully assembled vessels.

BRIEF DESCRIPTION OF THE DRAWINGS

FIG. 3 is an elevational view, partly in section, showing multiples of the top section, the bottom section and the partition forming the aeration vessel shown in FIG. 1 nested together and on the trailer of a tractor-trailer for transport.

DESCRIPTION OF THE PREFERRED EMBODIMENTS

Figure 1:
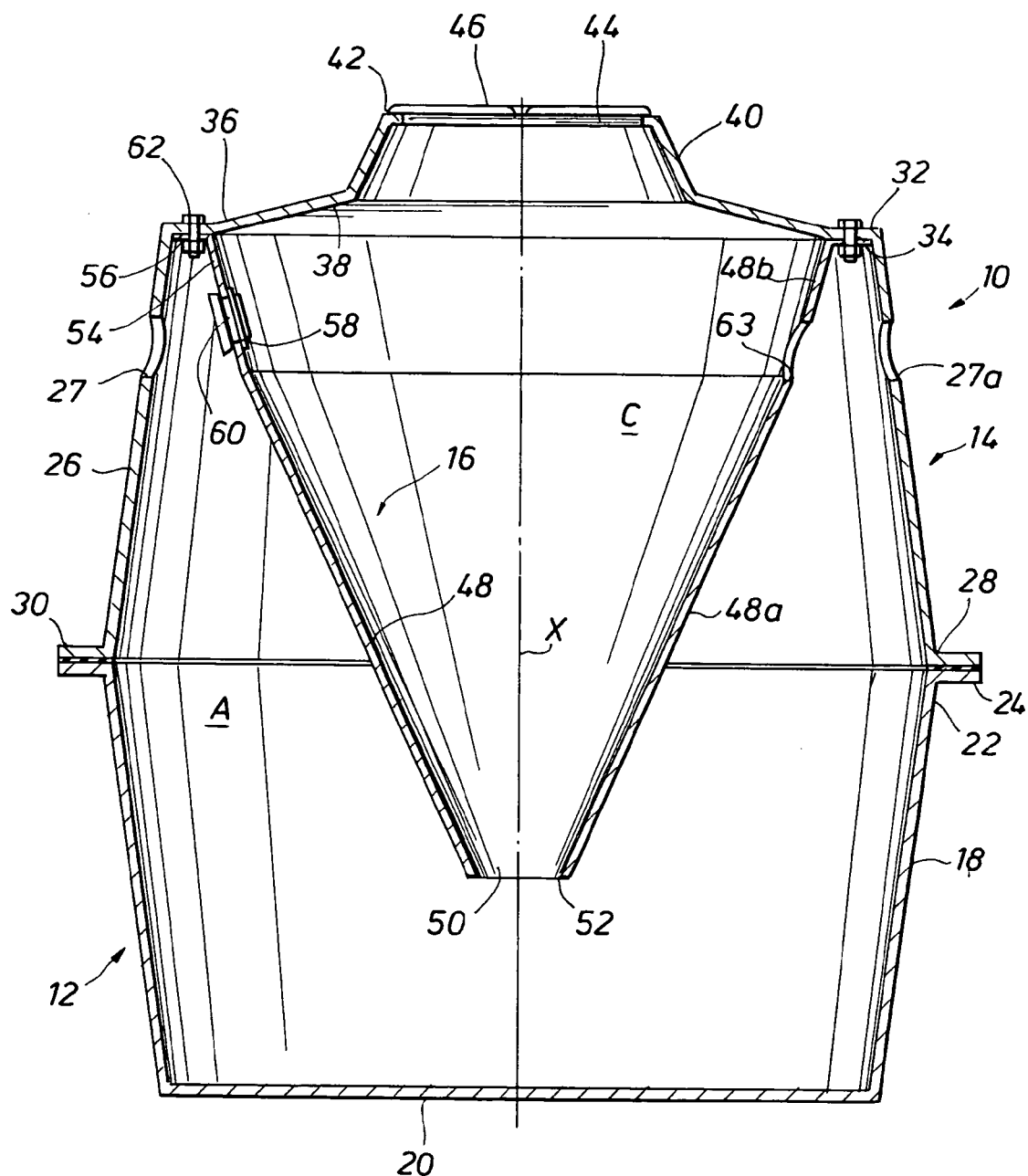
FIG. 1 is an elevational, cross-sectional view of one embodiment of the aeration vessel of the present invention.

Referring first to FIG. 1, one embodiment of the aeration vessel of the present invention is shown generally as 10. Vessel 10 comprises a first or bottom section 12, a second or top section 14, and a partition 16. Bottom section 12 has an inverted frustoconical side wall 18 and a bottom wall 20. An annular, flange 24 extends radially outwardly from upper edge 22.

Top section 14 comprises a frustoconical wall 26 having a lower edge indicated at 28. Extending outwardly from lower edge 18 is an annular, flange 30, flanges 30 and 24 mating in a manner described hereafter. Frustoconical side wall 26 has a first opening 27 and a second opening 27a. While not necessary, openings 27 and 27a are generally diametrically opposed from one another and of equal diameter. Top section 14 further includes an annular, top flange 32 extending radially inwardly from an upper edge 34 of frustoconical side wall 26. Top flange 32 has an annular, radially innermost edge 36 from which extends an annular connecting wall 38, connecting wall 38 being connected to a frustoconical neck wall 40, frustoconical wall 40 terminating in an annular rim 42 defining an opening 44 therein. As shown, opening 44 is covered with a selectively removable hatch or cover 46 to permit access to the interior of vessel 10.

Partition 16 has an inverted frustoconical wall 48 with a bottom mouth or opening 50 defined by the lower edge 52 of inverted frustoconical wall 48. Partition 16 serves to divide vessel 10 into a clarifier chamber C and an aeration chamber A. As can be seen, partition wall 48 has a lower section 48a, which terminates in mouth 50 and an upper section 48b, which forms an upper edge 54 of partition wall 48. As can also be seen, sections 48a and 48b are at different angles. More specifically, section 48a is at a greater angle relative to an imaginary line, indicated as X, passing axially through the center of partition 16 than is section 48b. However, as can be seen both sections 48a and 48b are inverted frustoconical sections. Accordingly, it is to be understood that when the terms "frustoconical," "frustoconical wall," "inverted frustoconical wall" or similar terms are used, it is to be understood that such walls can be made up of wall sections or segments having different angles albeit that all such sections are frustoconical or inverted frustoconical in nature. An annular, radially outwardly projecting flange 56 extends from upper edge 54. Top flange 32 forms an axially downwardly facing, annularly extending connector surface, while flange 56 forms an axially upwardly facing connecting surface, the connecting surfaces being secured together by a series of circumferentially spaced nut and bolt combinations 62 received through registering holes in flanges 32 and 56. It will be appreciated, however, that partition 16 can be secured to the interior of vessel 10 by other means. For example, flanges 32 and 56 could be secured to one another by means of a suitable adhesive, putty or the like. Additionally, formations could be provided on flanges 32 and 56 to provide a mechanical interlock between partition 16 and top section 14 of vessel 10.

Partition 16 is also provided with an access port 58 in which is received a tapered plug 60, access port 58 providing an inspection opening. Partition wall 48 also has a second opening 63, opening 62 being in register with opening 27a. Openings 62 and 27a are adapted to receive a pipe or conduit (not shown) through which clarified water from clarifier chamber C can flow to a pump tank or otherwise for disposal. In assembling aeration vessel 10, partition 46 would be positioned in top section 14 such that the axially facing connecting surfaces on flanges 32 and 56 would be in register. As noted above, flanges 32 and 56 could then be secured together by a number of techniques.

Once partition 16 is positioned in and connected to upper section 14 as described above, upper section 14 can then be secured to lower section 12. In this regard as noted, flanges 30 and 24, as seen in FIG. 1, are substantially in register, flange 24 having a annular, axially upwardly facing mating surface, flange 30 having an annular, axially downwardly facing mating surface. Flanges 24 and 30 can be secured together to form a fluid-type seal between the axially, downwardly facing mating surface on flange 30 and the axially, upwardly facing mating surface on flange 24. This can be accomplished in much the same manner that flanges 32 and 56 are secured together. However, in the case of flanges 24 and 30, fluid-type engagement is necessary since the liquid level in vessel 10 will generally always be above the upper edge of wall 18. Accordingly, flanges 24 and 30 can be secured together by means of an annular gasket and a circumferential pattern of nut and bolt assemblies, such as nut and bolt assembly 62. Alternatively, flanges 24 and 30 can be secured together by an adhesive which effectively permanently secures upper and lower sections 14 and 12 together, as well as forming a fluid-type seal. It is also possible for flanges 24 and 30 to be mechanically secured together by interengaging or interlocking formations formed on the flanges. Additionally, segmented, circular clamps equipped with a hose clamp-like tightening mechanism can be used. Such clamps are commonly cylindrical bodies having outwardly extending flanges together, and are provided with a knob such that when the segmented sections are received over the radially outwardly projecting flanges of the cylindrical bodies, turning of the knob results in compressing the two cylindrical bodies together forcing the bodies into fluid-tight sealing with an O-ring received in registering grooves in the cylindrical bodies. It is apparent that such an assembly could be used to sealingly engage flanges 24 and 30.

Figure 2:
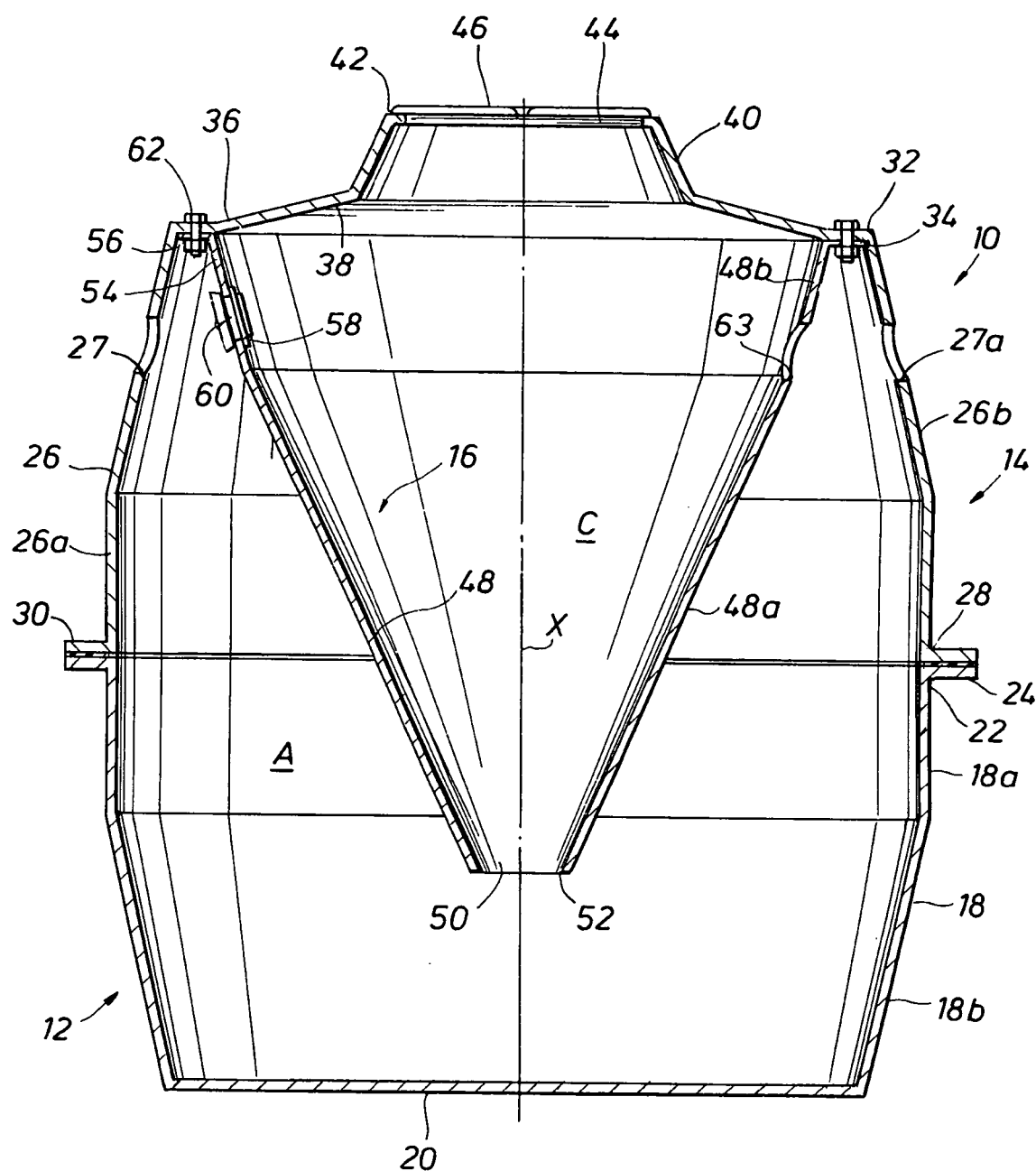
FIG. 2 is an elevational, cross-sectional view of another embodiment of the aeration vessel of the present invention.

Turning now to FIG. 2, there is shown a slightly modified version of the aeration vessel shown in FIG. 1. The vessel shown in FIG. 2, differs from that shown in FIG. 1, only in the fact that frustoconical wall 26 has a first frustoconical section 26a, and a second frustoconical section 26b which are at different angles. Thus again with respect to an imaginary line indicated as X passing through the center of partition 16, wall section 26a is at a smaller angle to imaginary line X than is wall section 26b. Likewise, inverted frustoconical wall 18 is comprised of two wall sections 18a and 18b which are at different angles, wall section 18a being at a smaller angle to imaginary line X than wall section 18b. However, as in the case of partition 16, all of the various wall section 26a, 26b, 18a, and 18b are frustoconical or inverted frustoconical in nature. It will also be appreciated that, if desired, partition wall 48 as well as walls 18 and 26 could have three or more frustoconical or inverted frustoconical sections all at different angles to one another but nonetheless all constituting a "single frustoconical" or "inverted frustoconical" wall as noted above.

In addition to providing mating surfaces for assembly of upper and lower sections 14 and 12, respectively, flanges 24 and 30 serve a function of providing an annular reinforcing rib. As was discussed above, in prior art cylindrical vessels, the weakest point in the wall of the vessel is generally at the midpoint between the upper and lower ends of the vessel. It has been found that it is generally in this middle region or section that pressure from the surrounding formation in which the vessel is buried can cause the cylindrical vessels to crack and begin leaking. In the aeration vessel of the present invention, however, the flanges 30 and 24, cooperating as they do to form an annular reinforcing rib, greatly strengthen vessel 10 in its middle section, i.e., at the juncture formed by flanges 24 and 30.

As noted above, one feature of the aeration vessel of the present invention is that the three major components i.e., bottom section 22, top section 14 and partition 16, prior to being assembled to form aeration vessel 10, are nestable in one another. FIG. 3 depicts a truck comprised of a tractor 100 and a trailer 102 having a bed 104 for the support of cargo. Resting on bed 104 are stacks of partitions 16, top sections 14 and bottom sections 12 which are nested on one another for transport purposes. While only 3 each of each of the respective components are showing as being nested or stacked, it will be apparent that the only limitation in the number of such components which can be stacked or nested are height requirements dictated by regulations covering transport of cargo on highways, railways, etc. However, it can clearly be seen that with the uniquely nestable components forming aeration vessel 10, it is possible to ship what effectively constitutes multiple aeration vessels in a fraction of the space that would be required to ship fully completed vessels, particularly fully completed cylindrical vessels, which of practical necessity must be shipped in fully completed form. By way of example, it can be seen that each of the stacks or nests of the individual components effectively occupy a bed area on bed 104 which would be occupied by a fully completed vessel be it an aeration vessel of the present invention or one of the prior art cylindrical vessels. Thus, assuming that bed 104 had a bed area which would only accommodate the footprints of one each of sections 12, 14 and partition 16, then only three vessels, if in fully completed form and particularly if cylindrical in nature, could be shipped. This is to be contrasted with the present invention wherein the only limitation on the number of vessels, albeit not completed, that could be shipped, are regulations related to height requirements.

While the individual components of the aeration vessel can be made of a variety of materials, preferably the three major components described above, are made from a composite where composite is intended to include compositions made of a blend of two or more materials, often non-metallic. For example, fiberglass, composed of glass fibers embedded in a plastic resin matrix. The materials making up the composite complement each other's strength and eliminate their weaknesses. For example, if one of the components is a fiber such as fiberglass, quartz, kevlar carbon fiber, etc., tensile strength is imparted to the composite while the other component, often called a matrix, usually a resin such as polyester or epoxy that binds the fibers together, most often renders the material stiff and rigid. Additionally, mineral fillers may be added to enhance the flex modulus or the like. Composites are also intended to include aggregates instead of or in addition to fibers.

The components of the aeration vessel of the present invention can be made using conventional molding techniques well known to those skilled in the art.

The foregoing description and examples illustrate selected embodiments of the present invention. In light thereof, variations and modifications will be suggested to one skilled in the art, all of which are in the spirit and purview of this invention.

What is claimed is:

1. An aeration vessel for use in an aerobic wastewater treatment system comprising:
   a bottom section component comprising an inverted frustoconical side wall, having an upper edge, a first annular, radially outwardly extending flange extending from said upper edge, said first flange forming an annular, axially upwardly facing, first mating surface, and a bottom wall;
   a top section component comprising a frustoconical side wall having a lower edge, and a top edge, a second annular, radially outwardly extending flange extending from said lower edge, said second flange forming an annular, axially downwardly facing second mating surface, said top section component further including an annular, radially inwardly extending top flange extending from said top edge, said top flange forming an annular, axially downwardly facing, first connection surface; and
   a partition component disposed in said aeration vessel, said partition component comprising an inverted frustoconical partition wall having a bottom mouth and an upper, partition edge, an annular, radially outwardly extending partition flange extending from said upper partition edge, said partition flange forming an annular, axially upwardly facing, second connection surface;
   said first and second mating surfaces being in sealing engagement, said first and second connection surfaces being mated together; and
   said bottom section component being nestable with a second bottom section component substantially identical to said bottom section component, said top section component being nestable with a second top section component substantially identical to said top section component, and said partition section component being nestable with a second partition section component substantially identical to said partition section component.

2. The aeration vessel of claim 1, wherein said top flange has a annular, radially innermost edge and there is a head portion connected to said radially innermost edge, said head portion including a neck portion having a frustoconical neck wall, said frustoconical neck wall defining an annular rim, said rim defining an opening.

3. The aeration vessel of claim 2, wherein said head portion includes an annular connecting wall between said frustoconical neck wall and said innermost edge of said top flange.

4. The aeration vessel of claim 3, wherein said connecting wall is frustoconical.

5. The aeration vessel of claim 1, wherein said partition wall has first and second axially extending sections, said first and second sections being at different angles.

6. The aeration vessel of claim 5, wherein said first section of said partition wall forms said top edge.

7. The aeration vessel of claim 5, wherein there are first and second apertures in said partition wall.

8. The aeration vessel of claim 7, wherein said first and second apertures are generally diametrically aligned.

9. The aeration vessel of claim 7, wherein said apertures are formed in said first section of said partition wall.

10. The aeration vessel of claim 5, wherein the angle of said first section of said partition wall relative to an imaginary line passing axially through the center of said partition wall is less than the angle of said second section to said imaginary line.

11. The aeration vessel of claim 2, comprising a cover removably secured over said opening in said frustoconical neck wall.

12. The aeration vessel of claim 1, wherein said first and second annular flanges are substantially at the mid point of said aeration vessel as measured from said bottom wall to said top edge of said frustoconical side wall of said top section component.

13. The aeration vessel of claim 1, wherein said bottom section component, said top section component and said partition component are made of a composite.

14. A vessel for use in an aerobic wastewater treatment system comprising:
   a bottom section component comprising an inverted frustoconical side wall, having an upper edge, a first annular, radially outwardly extending flange extending from said upper edge, said first flange forming an annular, axially upwardly facing, first mating surface, and a bottom wall;
   a top section component comprising a frustoconical side wall having a lower edge, and a top edge, a second annular, radially outwardly extending flange extending from said lower edge, said second flange forming an annular, axially downwardly facing second mating surface;
   said first and second flanges being in the middle section of said vessel as measured from said bottom wall to said top edge;
   said first and second mating surfaces being in sealing engagement; and
   said bottom section component being nestable with a second bottom section component substantially identical to said bottom section component and said top section component being nestable with a second top section component substantially identical to said top section component.

15. The vessel of claim 14, wherein said flanges are substantially at the midpoint of said vessel.

16. The aeration vessel of claim 1, wherein the frustoconical side wall of said bottom section component extends from substantially said upper edge to said bottom wall, said frustoconical side wall of said top section component extends substantially from said lower edge to said top edge and said frustoconical partition wall of said partition component extends substantially from said mouth to said upper, partition edge.

17. The vessel of claim 14, wherein said frustoconical side wall of said bottom section component extends substantially from said upper edge to said bottom wall and said frustoconical side wall of said top section component extends substantially from said lower edge to said top edge.

* * * * *